Oct. 3, 1967
E. J. SWEETLAND, JR
3,345,037
REMOVABLE TRAILER SUPPORT
Filed Sept. 28, 1965
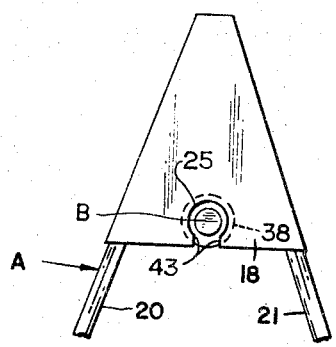
FIG_1
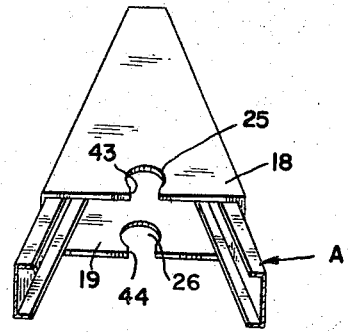
FIG_3
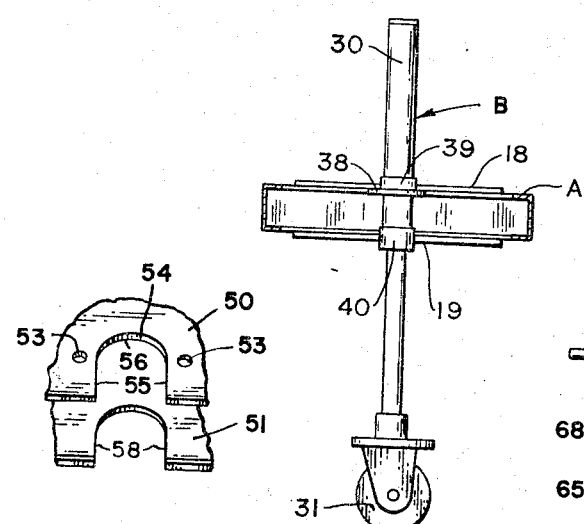
FIG_5  FIG_2
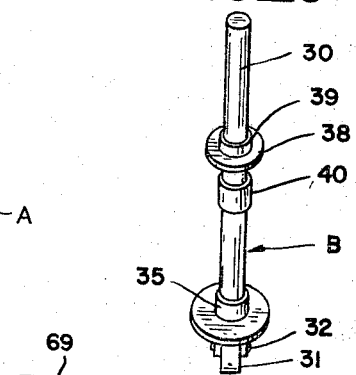
FIG_4
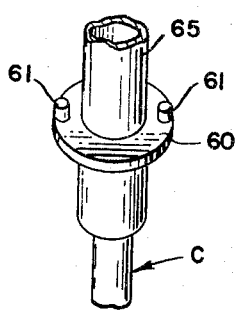
FIG_6
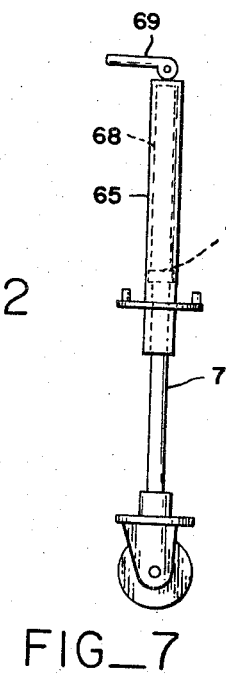
FIG_7
INVENTOR.
ERNEST J. SWEETLAND JR.
BY
*Townsend & Townsend*
ATTORNEYS United States Patent Office 3,345,037
Patented Oct. 3, 1967

3,345,037
REMOVABLE TRAILER SUPPORT
Ernest J. Sweetland, Jr., 940 N. Fair Oaks Ave., Pasadena, Calif. 91103
Filed Sept. 28, 1965, Ser. No. 490,843
5 Claims. (Cl. 254—86)

ABSTRACT OF THE DISCLOSURE

A device for attachment to the yoke of a trailer in which a vertical element ran be removably attached to a bracket mounted at the yoke which incorporates a locking mechanism which prevents withdrawal of the vertical support while the yoke is loaded on the vertical member and which further allows the removal of the vertical member upon raising the yoke relative to the vertical member.

---

This invention relates to a removable support for connection to the yoke of a trailer and to maintain the yoke in elevated position.

In trailers, such as, house trailers, boat trailers, and the like, the yoke of the trailer is normally adapted for connection to a vehicle. While connected to the vehicle, the yoke assembly is generally maintained in a horizontal position with the yoke being supported by the vehicle and the remainder of the trailer body being supported by its own wheels. Normally, when the trailer is disconnected from the vehicle, the yoke must be supported in order to maintain the trailer on a level axis. This sometimes creates a problem, particularly in heavy trailers, where the load of the yoke is substantial. Furthermore, it is obvious that the yoke support must be removed when the trailer is again connected to a pulling vehicle.

It is the principal object of this invention to provide a support removably engageable with the yoke of a trailer to function as an independent yoke support when the trailer is disconnected from its carrying vehicle and which further is removable from attachment to the yoke when the yoke is again connected to the carrying vehicle in order not to interfere with the normal towing operation of the vehicle.

Another object of this invention is to provide a novel yoke support having a depending leg which firmly locks to the yoke with the depending leg in a vertical position which the supported device is under load and which is freely disengageable from the yoke when the device is unloaded.

A feature and advantage of this invention lies in the fact that the trailer support can be freely installed while the yoke is held in supported engagement with its carrying vehicle and when disengaged from the vehicle the yoke will apply load to the support which firmly holds the support in locked position.

A further feature and advantage of this invention lies in the fact that the device may be easily removable by simply unloading the yoke of the trailer to allow for the easy removal of the supporting device.

Another object of this invention is to provide a trailer support in which the yoke of the vehicle is fitted with keyways and in which the supported device is formed of a shaft having a diameter proximate the entry diameter of the keyway and is flanged with a flange having a diameter substantially greater than the keyway diameter and further provided with a bushing having a diameter equaling that of the keyway but larger than the keyway entry mounted directly above the flange whereby the support can be mounted by sliding the shaft through the keyway entry and thence lowering the keyway for positioning the keyway over the bushing for locked support on the flange.

A further feature and advantage of this device lies in the fact that the trailer support encompasses a minimum of parts and a simplicity in construction enabling the device to be easily installed and removed without the necessity for tools and special equipment.

A still further object of this invention is to provide a jack assembly in combination with the trailer support so that the yoke may be raised or lowered to facilitate attachment onto or removal from the pulling vehicle.

Other objects, features, and advantages of the present invention will be more apparent after referring to the following specification and attached drawings in which:

FIG. 1 is a top plan view of a trailer yoke fitted with the supported device of the present invention.

FIG. 2 is an elevation of FIG. 1.

FIG. 3 is a perspective view showing the trailer yoke having the keyway and with the supporting device removed.

FIG. 4 is a perspective view of the supporting device disengaged from the trailer support.

FIG. 5 is a fragmentary view of an alternative support receiving slot for an alternate embodiment of the invention.

FIG. 6 is a fragmentary perspective view of the trailer support for utilization with the support holder of FIG. 5; and FIG. 7 is a view of an alternative embodiment of the invention incorporating a jack assembly associated with the flange to enable the device to function to raise or lower the yoke.

In the embodiment shown in FIGS. 1, 2, 3, and 4 the support device is attached at the forward end of the yoke A of a trailer. The yoke normally is formed at the front end of the trailer and is arranged at its tip with a ball socket fitting (not shown) which is adapted for attachment to the complementary part of the fitting attached to the power vehicle. In the aforesaid embodiment, a top plate 18 and a bottom plate 19 are mounted over the two legs 20 and 21 forming yoke A. Both plates 18 and 19 are formed with coaxial aligned keyways 25 and 26 mounted on the upper and lower plates respectively. Keyways 25 and 26 are in vertical, axial alignment orientation. Supporting device B is adapted for removable nesting within the two keyways.

Supporting device B is formed of a vertically disposed shaft 30 having at its bottom a wheel 31 mounted between a bifurcated axle support 32 for the wheel which in turn is rotatably mounted at 35 to shaft 30. The wheel 31 thus in caster-like arrangement can rotate horizontally as well as vertically.

In the mid-portion of shaft 30 is provided a supporting flange 38 rigidly mounted to the shaft. Immediately above flange 38 is a cylindrical bushing 39, also rigidly attached to the shaft. Below flange 38 is another bushing 40 spaced from the flange and also rigidly attached to shaft 30. The diameter of bushings 39 and 40 is proximate the diameter of keyways 25 and 26 respectively and is of larger diameter than the keyway entries 43 and 44 forming the mouth for keyways 25 and 26 respectively. Bushing 40 is mounted on shaft 30 at a position of its outer walls in alignment with keyway 26 when bushing 39 is nested in keyway 25.

In operation, yoke A is held at an elevation wherein the shaft 30, in the areas above bushing 39 and 40, can fit through mouths 43 and 44 into keyways 25 and 26; in the aforesaid position, shaft 30 is maintained in vertical alignment. Yoke A is then lowered wherein plate 18 at the area adjacent keyway 25 rests upon flange 38 to support the yoke. In this condition lateral movement of the shaft relative to plates 18 and 19 is prevented by the tight engagement of flange 39 with keyway 25 and flange 40 with keyway 26. The mouths 43 and 44 of keyways 25 and 26 being of smaller dimension restrain the withdrawal of bushings 39 and 40 from the respective keyways thus insuring locked lateral support for the trailer support device. In this condition, the wheel 31 enables the trailer to be hand-moved to various locations upon the bearing support of the wheel while maintaining the yoke in horizontal disposition.

In order to remove the supported device B from the keyways, the yoke A is lifted to a point where the two keyway mouths 43 and 44 clear the top of bushings 39 and 40. In this position the device is easily removable due to the fact that the diameter of shaft 30 is less than the diameter of the keyway mouths.

While the two plates 18 and 19 have been shown as being more or less permanently mounted to yoke A, it is believed, obviously, that the two plates can be mounted by any convenient means to one or another or both legs 20 and 21 forming the yoke.

In FIGS. 5 and 6 there is provided another embodiment of the invention in which keyways are formed of constant entry diameter. The supported mechanism comprises, mounted on yoke A, a pair of plates 50 and 51. The upper plate 50 is provided with two holes 53 on opposite sides of the formed keyway 54. Keyway 54 is formed in a generally U-shaped configuration having parallel side walls 55 and a circular web 56. The bottom plate 51 is provided with a similar keyway 58 having an identical U-shaped configuration.

The trailer support device C is formed with a flange 60 having two upwardly projecting pins 61 mounted on the top face of the flange. The two pins are of a diameter equal to the holes 53 in plate 50 and are spaced to mate with the aforesaid holes when the support device C is fitted into the two keyways 54 and 58. As previously described, the yoke is lifted to enable the shaft 65 upon which flange 60 is mounted to be fitted into the two keyways. The web diameter and the spacing between the side walls of the keyways are complementary with the shaft 65 to allow snug and firm engagement between the two members. In this position the pins 61 are aligned with the apertures 53 upon the lowering of the yoke pin 61 and engaging the apertures 53 to hold the mechanism in locked engagement. Removal of the device is accomplished as hereinbefore specified wherein the yoke is raised to free pins 61 from apertures 53.

As an alternative in the embodiment of the invention, as shown in FIG. 7, a jack mechanism can be employed in combination with shafts 30 or 65, by which, in the upper portion of the shaft 65 there is provided a threaded screw 68 actuatable by a handle 69 extending from the uppermost portion of shaft 65. In depending entrant from shaft 68 is a wheel supported rod 70 telescopically fitted into shaft 68 and forming at its top a threaded member 71 non-rotatably mounted to the inside wall of shaft 65. It can be seen, the rotation of handle 69 will cause rotation of threaded member 71 which in turn will act to cause vertical reciprocation of the depending rod 70. The aforesaid mechanism thus functions as a jack to raise and lower the yoke in accordance with the control of actuating handle 69.

While one embodiment of this invention has been shown and described, it will be apparent that other adaptations and modifications can be made without departing from the true spirit and scope of the invention.

What is claimed is:

1. A device for supporting the yoke of a trailer comprising a pair of spaced-apart support plate means, means to mount said plate means on said trailer yoke in a horizontal position, said plate means formed to provide keyways disposed in vertical, axial alignment; a vertical shaft mountable in said keyways, flange means rigidly mounted on said shaft and extending outwardly therefrom in engagement with the bottom of said plate means to restrain the plate means against downward movement relative to said shaft, locking means mounted on said shaft and projecting upwardly therefrom, said shaft being freely insertable into and removable from said keyways when said plate means are in a raised position relative to said shaft, and said locking means engageable with said plate means to lock said shaft against lateral movement relative thereto when said plate means are moved to a lower position relative to said shaft.

2. A trailer support according to claim 1 and wherein said locking means comprises a bushing having a larger diameter than said shaft mounted on said shaft above said flange means and said keyway being formed of a diameter equal to the diameter of said bushing and formed with a mouth having an opening smaller than the diameter of said bushing and greater than the diameter of said shaft.

3. A trailer device according to claim 1 and wherein said locking means comprises pin means mounted on and projecting upwardly from said flange and wherein said plate means is formed with pin receiving apertures, positioned to receive said pin means when said shaft is mounted within said keyway.

4. A trailer supported device for supporting the yoke of a trailer comprising a pair of spaced-apart parallel plates, means mounting said plates in horizontal relation to said yoke, said plates each formed with a keyway, said keyways being disposed in vertical, axial alignment, a support member adapted for engagement with said keyway, said support member having a shaft adapted to be mounted within said keyways in vertical orientation, a flange rigidly mounted on said shaft and engageable with at least one of said plates to prevent relative downward movement of said plate relative to said shaft when said shaft is mounted within said keyway, and a rod telescopically mounted within said shaft and depending therefrom, and means to raise and lower said rod relative to said shaft.

5. A trailer support device for supporting the yoke of a trailer comprising bracket means mounted on said yoke, said bracket means formed with an upper and lower surface disposed in spaced-apart relation, a vertically orientated keyway formed by said bracket means between said upper and lower surfaces, a support member adapted for vertical engagement within said keyway, a flange rigidly mounted on said support member and engageable with the bottom of said surfaces to prevent relative downward movement of said bracket relative to said support member when said support member is mounted within said keyway, and means mutually engageable with said bracket means and said support member to lock said support member against transverse movement within said keyway, said lock means being releasable upon said bracket being moved upwardly relative to said support member.

References Cited

UNITED STATES PATENTS

| | | | |
|---|---|---|---|
| 1,526,530 | 2/1925 | Clifford | 254—86 |
| 2,004,803 | 6/1935 | Winn | 280—150.5 |
| 2,638,315 | 5/1953 | Wagner | 254—86 |
| 2,650,055 | 8/1953 | Perkins | 254—86 X |
| 2,903,977 | 9/1959 | Ulinski | 248—352 X |
| 3,086,752 | 4/1963 | Wetter | 254—86 |
| 3,266,817 | 8/1966 | Engstrom | 270—475 |

FOREIGN PATENTS

| | | |
|---|---|---|
| 1,011,510 | 4/1952 | France. |

ROY D. FRAZIER, *Primary Examiner.*

A. FRANKEL, *Assistant Examiner.*